(12) United States Patent
Park

(10) Patent No.: US 9,509,753 B2
(45) Date of Patent: Nov. 29, 2016

(54) MOBILE APPARATUS AND METHOD FOR CONTROLLING THEREOF, AND TOUCH DEVICE

(71) Applicant: SAMSUNG ELECTRONICS CO., LTD., Suwon-si (KR)

(72) Inventor: Sang-jun Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/468,566

(22) Filed: Aug. 26, 2014

(65) Prior Publication Data

US 2015/0195335 A1    Jul. 9, 2015

(30) Foreign Application Priority Data

Jan. 8, 2014   (KR) .................. 10-2014-0002516
Apr. 17, 2014  (KR) .................. 10-2014-0045882

(51) Int. Cl.
| | |
|---|---|
| *H04L 29/08* | (2006.01) |
| *H04L 29/06* | (2006.01) |
| *G06F 3/0484* | (2013.01) |
| *G06F 3/0488* | (2013.01) |
| *G06F 3/0482* | (2013.01) |
| *G06F 21/31* | (2013.01) |
| *H04N 21/422* | (2011.01) |
| *H04N 21/258* | (2011.01) |

(Continued)

(52) U.S. Cl.
CPC ........... *H04L 67/025* (2013.01); *G06F 3/0482* (2013.01); *G06F 3/0488* (2013.01); *G06F 3/04842* (2013.01); *G06F 3/04883* (2013.01); *G06F 21/31* (2013.01); *H04L 63/08* (2013.01); *H04L 65/403* (2013.01); *H04N 21/25875* (2013.01); *H04N 21/4126* (2013.01); *H04N 21/42208* (2013.01); *G06F 17/241* (2013.01)

(58) Field of Classification Search
CPC . G06F 3/04842; G06F 17/241; H04L 65/403
See application file for complete search history.

(56) References Cited

U.S. PATENT DOCUMENTS 8,464,180 B1 *  6/2013  Kirkham ........... H04M 1/72586
                                                    715/765
2004/0246236 A1   12/2004  Hildebrandt et al.

(Continued)

FOREIGN PATENT DOCUMENTS

EP   2451141 A1    5/2012
JP   7-321978 A   12/1995

OTHER PUBLICATIONS

Why AppleTV & iPad beats Interactive Whiteboard . . . every time.; https://ryanorilio.wordpress.com/2013/01/20/why-appletv-an-ipad-beats-a-smartboard-everytime; Jan. 20, 2013.*

(Continued)

*Primary Examiner* — James Turchen
(74) *Attorney, Agent, or Firm* — Sughrue Mion, PLLC

(57) ABSTRACT

A mobile apparatus configured to communicate with a touch device is disclosed. The mobile apparatus includes a communication interface configured to communicate with a touch device; an interface configured to display a user interface window through which an input attribute for a touch that is input at the touch device is selected; and a controller configured to control the communication interface to transmit to touch device information based on the input attribute selected through the user interface window.

18 Claims, 14 Drawing Sheets

(51) Int. Cl.
*H04N 21/41* (2011.01)
*G06F 17/24* (2006.01)

(56) References Cited

U.S. PATENT DOCUMENTS

| | | | |
|---|---|---|---|
| 2005/0108751 A1 | 5/2005 | Dacosta | |
| 2008/0184115 A1* | 7/2008 | Back | G06Q 10/00 715/702 |
| 2011/0138459 A1 | 6/2011 | Bae et al. | |
| 2011/0234746 A1* | 9/2011 | Saleh | G06F 3/041 348/14.03 |
| 2011/0279248 A1* | 11/2011 | Ogawa | G08C 23/04 340/13.25 |
| 2012/0069054 A1* | 3/2012 | MacDonald | G06F 3/0321 345/676 |
| 2012/0084670 A1* | 4/2012 | Momchilov | G06F 3/04883 715/753 |
| 2013/0069915 A1* | 3/2013 | Kukulj | G06F 3/0236 345/175 |
| 2014/0041042 A1* | 2/2014 | Wong | G06F 21/6245 726/26 |
| 2014/0143856 A1* | 5/2014 | Wu | G06F 21/31 726/16 |

OTHER PUBLICATIONS

"Walk-and-Talk Interactive Whiteboard User Guide", Dec. 2011, 81 pages total, URL: http://techsupport.steelcase.com/Portals/0/support/userguide/WT_370-0381-02_EN.pdf.

"Polyvision WT1610 USB Walk-and-Talk Interactive Whiteboard", Mar. 2013, 4 pages total, URL: https://web.archive.org/web/20130313023508/http://www.touchboards.com/polyvision/wtl610.asp.

Communication dated May 27, 2015, issued by the European Patent Office in counterpart European Application No. 15150181.4.

Communication dated Jul. 15, 2016, issued by the European Patent Office in counterpart European Application No. 15150181.4.

Smart Technologies: "Quick Reference SMART Board Tools Using SMART Board Tools", Mar. 31, 2006, XP 055287511, Retrieved from the Internet: http://web.archive.org/web/20120917062605/http://downloads01.smarttech.com/media/services/quickreferences/pdf/english/smartboardtools.pdf Total 2 pages.

\* cited by examiner

FIG. 6A

| SELETION FREQUENCY INFORAMTION | ~600 |
|---|---|
| INPUT ATTRIBUTE ORDER | ACCUMULATED FREQUENCY |
| 1. COLOR | 15 |
| 2. THICKNESS OF LETTERS | 12 |
| 3. ERASER | 10 |
| 4. FONT OF LETTERS | 9 |
| 5. FIGURE | 6 |
| 6. SIZE OF LETTERS | 3 |
| 7. DISPLAY EFFECT | 2 |

610  620

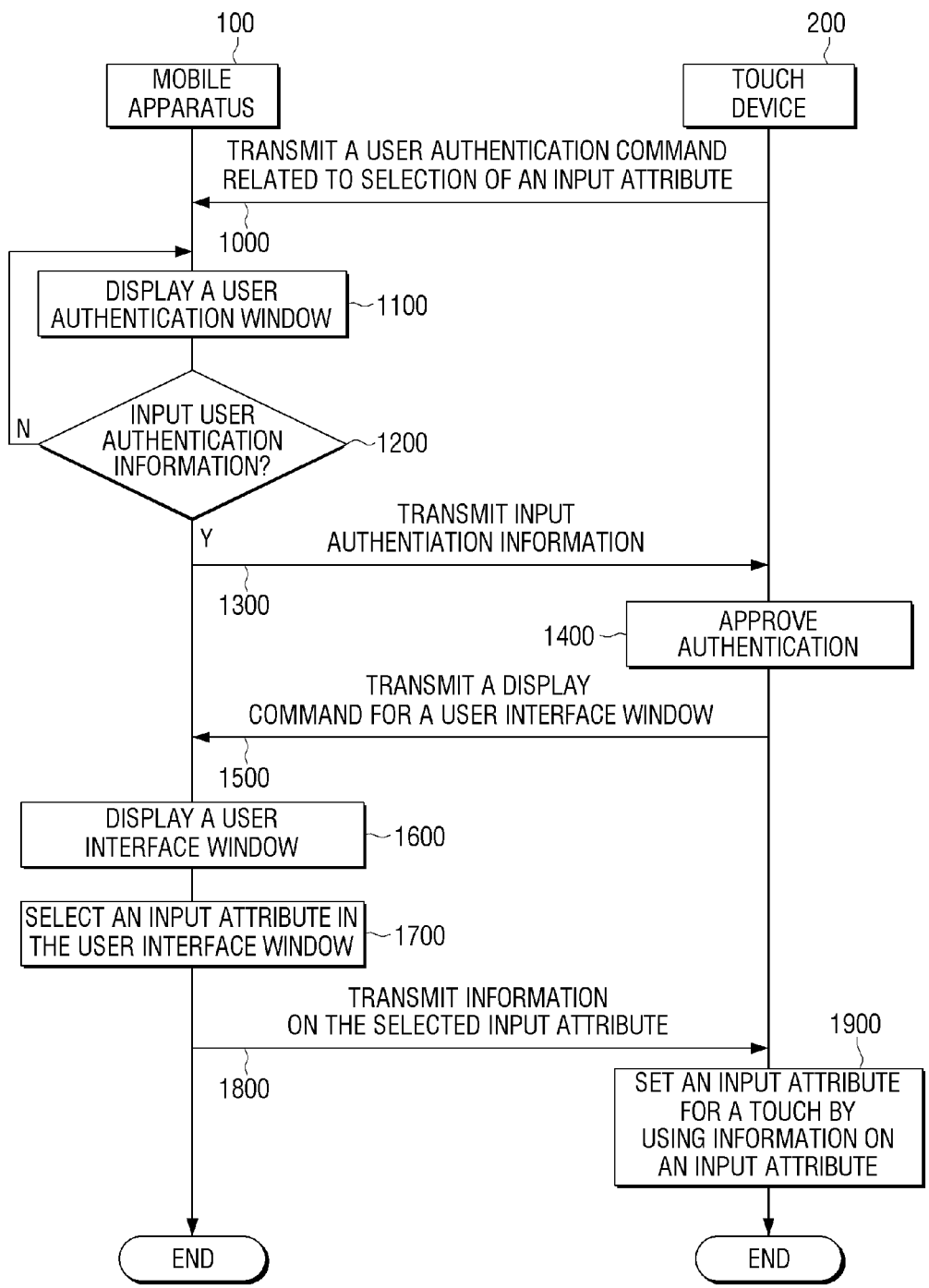

MOBILE APPARATUS AND METHOD FOR CONTROLLING THEREOF, AND TOUCH DEVICE

CROSS-REFERENCE TO RELATED APPLICATIONS

This application claims priority from Korean Patent Application No. 10-2014-0002516 filed on Jan. 8, 2014 in the Korean Intellectual Property Office, and Korean Patent Application No. 10-2014-0045882 filed on Apr. 17, 2014 in the Korean Intellectual Property Office, the disclosures of which are incorporated herein by reference in their entireties.

BACKGROUND

Technical Field

Systems, methods, and apparatuses consistent with exemplary embodiments relate to a mobile apparatus, a method for controlling thereof, and a touch device, more particularly to a mobile apparatus which may more easily control operations of a touch device, a method for controlling thereof, and a touch device.

Description of the Related Art

Touch display technology has been primarily applied to small or medium sized apparatus such as a cellular phone, a smartphone, and a tablet PC. Further proliferation in the use of touch display technology is expected. For example, touch display technology may eventually be universally utilized in a large apparatus such as a TV or an electronic board.

A user may experience similar convenience when viewing a large touch device as compared to current large display-only apparatus, but when a user goes to control operations of the large touch device through touching operations, the user may experience some inconvenience such as, for instance, large are traversals to reach to both approach the screen and to move about the screen surface to reach and touch designated portions of the large touch device.

For example, when an instructor explains teaching content using an electronic board, the instructor may touch various functions to control operations of the electronic board. However, the electronic board is large in size, and thus, the instructor, while explaining the teaching content, may have to move to positions where various functions on a screen are located in order to be able to touch the functions the instructor wants to use. If, the instructor wishes to change color of letters written on the electronic board from black to red, or to change red to black again, the instructor touches corresponding colors. This operation is repeated for several times during teaching, and thus, the instructor needs to move a lot to select a function. Accordingly, the instructor feels inconvenient due to frequent moving during teaching. Additionally, the instructor may also need to call-up and navigate an array of menus that contain the different the options in addition to having to traverse large areas thereby further affecting the instructor's lesson presenting the teaching content.

Further, when a touch device is hung on a wall or is placed on a table, a user's hand may not reach the entirety of the touch device surface. Accordingly, some functions displayed on a screen may not be reached by the hand of a user, and thus, a user could not use these functions freely.

SUMMARY

One or more exemplary embodiments provide a mobile apparatus which may enable easier control of operations of a touch device, a method for controlling thereof, and a touch device, by providing a user interface window including at least one input attribute which will be used for writing and drawing operations according to a touch.

According to an aspect of an exemplary embodiment, there is provided a mobile apparatus including a communication interface configured to communicate with a touch device, an interface configured to display a user interface window through which an input attribute for a touch that is input at the touch device is selected, and a controller configured to control the communication interface to transmit to touch device information based on the input attribute selected through the user interface window.

The communication interface may be further configured to receive, from the touch device, a user authentication command related to selection of the input attribute, wherein the controller may be further configured to control the interface to display a user authentication window according to the user authentication command, and in response to authentication information being input in the user authentication window, control the communication interface to transmit the authentication information to the touch device.

The communication interface may be further configured to receive, from the touch device, a display command for the user interface window, and wherein the controller may be further configured to control the interface to display the user interface window according to the display command.

The user interface window may include at least one input attribute which will be used for writing and drawing operations according to the touch.

The controller may be further configured to accumulate a selection frequency of the at least one input attribute, and configure the user interface window to display the at least one input attribute in an order of the selection frequency.

The communication interface may be further configured to receive, from the touch device, information on configuration of the at least one input attribute on the user interface window, and configure the user interface window to be the same as the user interface window of the touch device based on the information on configuration.

The controller may be further configured to, in response to a user command being input, through the interface, to change configuration of the at least one input attribute included in the user interface window, control the interface to display an input attribute selection window and configure the user interface window based on input attribute selections made in the input attribute selection window.

The at least one input attribute may be at least one from among a color, a figure, a font of letters, a size of letters, a thickness of letters, a display effect, and an eraser which are used for the writing and drawing operations.

The touch device information based on the input attribute may include at least one of a type of the input attribute and an attribute value of the input attribute which are selected by a user.

The touch device may be an electronic board.

According to an aspect of another exemplary embodiment, there is provided a method for controlling a mobile apparatus configured to communicate with a touch device. The method includes displaying a user interface window through which an input attribute for a touch that is input at the touch device is selected, and transmitting, to the touch device, touch device information based on the input attribute selected through the user interface window.

The displaying the user interface window may include receiving from the touch device a user authentication command related to selection of the input attribute, displaying a user authentication window according to the user authentication command, and transmitting, in response to authentication information being input in the user authentication window, the authentication information to the touch device.

The displaying the user interface window may include receiving, from the touch device, a display command for the user interface window, and displaying the user interface window according to the display command.

The user interface window may include at least one input attribute which will be used for writing and drawing operations according to the touch.

The displaying the user interface window may include accumulating a selection frequency of the at least one input attribute and configuring the user interface window to display the at least one input attribute in an order of the selection frequency.

The displaying the user interface window may include receiving, from the touch device, information on configuration of the at least one input attribute on the user interface window, and configuring, based on the information on configuration, the user interface window to be the same as the user interface window of the touch device.

The displaying the user interface window may include displaying, in response to a user command being input, through the interface, to change configuration of the at least one input attribute included in the user interface window, an input attribute selection window, and configuring the user interface window based on input attribute selections in the input attribute selection window.

The at least one input attribute may be at least one from among a color, a figure, a font of letters, a size of letters, a thickness of letters, a display effect, and an eraser which are used for the writing and drawing operations.

The touch device information based on the input attribute may include at least one of a type of the input attribute and an attribute value of the input attribute which are selected by a user.

According to an aspect of another exemplary embodiment, there is provided A touch device including a communication interface configured to communicate with a mobile apparatus, a display configured to sense a touch, and a controller configured to, in response to a user event occurring, control the communication interface to transmit to the mobile apparatus, a display command for a user interface window through which an input attribute for the touch is selected, and in response to touch device information that is based on the input attribute being received from the mobile apparatus, set the input attribute according to the touch using the touch device information.

BRIEF DESCRIPTION OF THE DRAWINGS

The above and/or other aspects will become apparent and more readily appreciated from the following description of exemplary embodiments, taken in conjunction with the accompanying drawings, in which:

FIGS. 6A and 6B are views provided to explain a method for configuring a user interface window according to an exemplary embodiment.

FIG. 10 is a flowchart of a method for controlling a mobile apparatus according to another exemplary embodiment.

DETAILED DESCRIPTION

Figure 1:
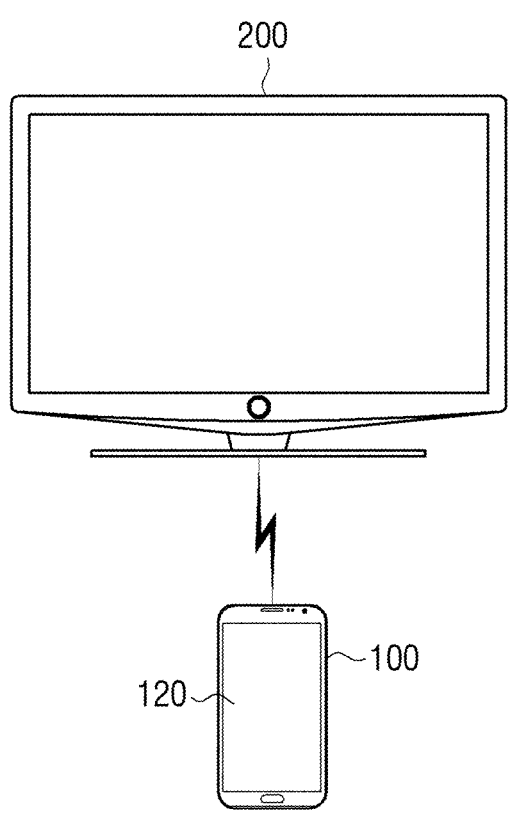
FIG. 1 is a view illustrating a touch display system according to an exemplary embodiment.

Hereinafter, exemplary embodiments will be described in greater detail with reference to the accompanying drawings. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. The scope is defined not by the detailed description but by the appended claims. Like numerals denote like elements throughout.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail because they would obscure the exemplary embodiments with unnecessary detail.

FIG. 1 is a view illustrating a touch display system according to an exemplary embodiment. Referring to FIG. 1, the touch display system includes the mobile apparatus 100 and the touch device 200.

The mobile apparatus 100 may be a cellular phone, smartphone, a personal digital assistant (PDA), a tablet PC, a 3G terminal, for example, an international mobile telecommunication 2000 (IMT-2000) terminal which uses wideband code division multiple access (WCDMA) technology, and a universal mobile telecommunication service (UMTS) terminal.

Alternatively, the mobile apparatus 100 may be a communication device exclusive for the touch device 200 aside from the aforementioned devices. In other words, the mobile apparatus may be a communication device which is provided when purchasing the touch device 200 such as a remote control.

The touch device 200 is a display apparatus which detects a touch, and the touch device may be a touch TV or a touch electronic board. The touch device 200 may detect a touch by a touch pen or by hands and may perform operations according to the touch.

In the touch display system illustrated in FIG. 1, when a user touches the touch device 200 thereby controlling the operations of the touch device 200, the mobile apparatus 100 may be used in conjunction with the user touch of the touch device 200, for example, to define the type of touch to expect at the touch device 200 from the user. In particular, a user may select an input attribute through a touch input at the mobile apparatus 100, which is transmitted to the touch device 200, from the mobile apparatus 100.

For example, when a user presents a presentation or teaching using the touch device 200, a user may write letters or draw pictures by touching a screen of the touch device 200. As such, a user may select by using the mobile apparatus 100 at least one input attribute which is to be used for writing and drawing by touch on the touch device 200.

Specifically, the mobile apparatus 100 and the touch device 200 communicate with each other. The mobile apparatus 100 includes the interface 120. The interface 120 may display a user interface window. The user interface window is configured to allow a user to select an input attribute using the mobile apparatus 100. The input attribute is then transmitted to the touch device 200 in accordance with the selecting touch provided at the mobile apparatus 100 that selected the input attribute which is to be applied to the touch device 200. Therefore, the user interface window may include at least one input attribute which, when selected by a touch at the mobile apparatus, will be used for writing and drawing operations at the touch device 200 according to subsequent touch provided at the touch device 200.

Herein, at least one input attribute may be at least one from among color, figure, font of letters, size of letters, thickness of letters, display effect, and an eraser which will be used for the writing and drawing operations.

If a user, while performing writing and drawing operations using the touch device 200, wishes to change an input attribute in accordance with a touch, a user may select an input attribute by using a user interface window displayed on the mobile apparatus 100. For example, a user selection may be realized by a button provided on the mobile apparatus 100, a keypad, or a touch. In particular, if the user selection is realized by touch, the interface 120 may be made of a touch screen.

The mobile apparatus 100, in response to a specific input attribute being selected in a user interface window, may transmit information related to the selected input attribute to the touch device 200. Accordingly, the touch device 200 sets an input attribute in accordance with a touch at the mobile apparatus 100 by using the received information related to the touch that defines the input attribute for a touch at the touch device 200.

For example, when a user selects "color" and "red" as an input apparatus through a touch at a user interface window of the mobile apparatus 100, the mobile apparatus 100 may transmit to the touch device 200 "color" which is type of an input attribute and "red" which is an attribute value of an input attribute as information.

Accordingly, the touch device 200, using information on the input attribute when writing and drawing operations occur according to a touch, may display the color of letters or drawings as red. In this method, an input attribute according to a touch of the touch device 200 may be set by selecting other input attributes including color.

According to a touch display system illustrated in FIG. 1, a user, by using the mobile apparatus 100, may more easily change an input attribute for a touch occurring at the touch device 200.

For example, a large-sized touch device 200 is available in sizes of 70 inches or more, and therefore changing an input attribute in accordance with a touch at the mobile apparatus 100, allows a user to avoid large movements to change an input attribute at the touch device 200 directly.

Figure 2:
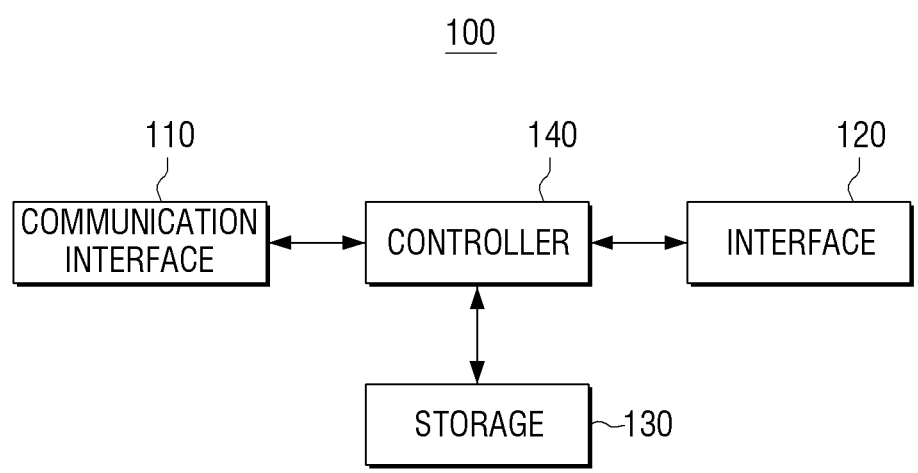
FIG. 2 is a block diagram illustrating the configuration of a mobile apparatus according to an exemplary embodiment.

FIG. 2 is a block diagram illustrating the configuration of a mobile apparatus according to an exemplary embodiment. The mobile apparatus 100 as illustrated in FIG. 2 includes a communication interface 110, an interface 120, a storage 130, and a controller 140.

The communication interface 110 communicates with the touch device 200. Specifically, the communication interface 110 may receive a specific command or a signal received from the touch device 200, and may transmit specific information, such as attribute information for touch input, to the touch device 200 based on a touch input received at the interface 120 of the mobile apparatus 100.

The interface 120 includes a display function, and may further include an input function in accordance with a touch. That is, the interface 120 may be a touch screen.

Specifically, the interface 120 displays a user authentication window or a user interface window related to an input attribute regarding a touch which is input to the touch device 200. In addition, the interface 120 may receive a user selection signal or a user input signal at a user authentication window or a user interface window.

The storage 130 stores the configuration of a user authentication window or a user interface window. Herein, the configuration of the user authentication window or the user interface window may be a display format which indicates how the windows are displayed in the interface 120. Further, the storage 130 accumulates and stores a selection frequency of an input attribute.

The controller 140 controls overall operations of the mobile apparatus 100.

The controller 140 may, in response to a user authentication command related to selection of an input attribute being received from the touch device 200 through the communication interface 110, control the interface 120 to display a user authentication window according to a user authentication command. In addition, in response to authentication information being input through a user authentication window, the controller 140 may control the communication interface 110 to transmit the authentication information to the touch device 200.

When authentication of the mobile apparatus 100 is approved by the touch device 200 according to the authentication information, the touch device 200 may transmit a command to display a user interface window to the mobile apparatus 100. Accordingly, when a command to display a user interface window is received through the communication interface 110, the controller 140 may control the interface 120 to display a user interface window according to the display command.

This user interface window is configured to allow for a selection of an input attribute for a touch which is to be input at the touch device 200. Specifically, when a user performs writing or drawing operations by touching a screen of the touch device 200, at least one input attribute which will be used for writing and drawing operations may be selected by using the mobile apparatus 100. In other words, an input attribute which is to be applied to the touch device 200 may be controlled by the mobile apparatus 100.

To do this, a user interface window, which includes at least one input attribute, may be displayed in the interface 120 of the mobile apparatus 100. Herein, at least one input attribute may be at least one from among color, figure, font of letters, size of letters, thickness of letters, display effect, and an eraser which will be used for the writing and drawing operations.

When a specific input attribute is selected through the user interface window, the controller 140 generates information on the selected input attribute. The information on the input attribute may include at least one of type of the input attribute and an attribute value of the input attribute which are selected by a user.

For example, when an "an eraser" is selected as an input attribute at a user interface window, the controller 140 may generate information on an input attribute by using "an eraser" which is type of an input attribute.

As another example, when "font of letters" and "Batang font" are selected as input attributes at a user interface window, the controller 140, by using "font of letters" which is type of an input attribute and "Batang font" which is attribute value of an input attribute, may generate information on an input attribute. In other words, when there is a plurality of attribute values for one input attribute, information on an input attribute may further include an attribute value in addition to type of an input attribute.

As described above, a user, by using the mobile apparatus 100, may change an input attribute for a touch which is input at the touch device 200 more easily.

An input attribute included in a user interface window may be configured in various ways in accordance with user's convenience and user' favor.

According to an exemplary embodiment, the controller 140, when a specific input attribute is selected in a user interface window, may accumulate selection frequency on the corresponding input attribute and store the selection frequency in the storage 130. In addition, the controller 140 may configure a user interface window so that at least one input attribute which is included in a user interface window is listed in an order of selection frequency accumulated in the storage 130. The controller 140, by storing the configured user interface window in the storage 130, may update the configuration of a user interface window, that is, a display format.

According to another exemplary embodiment, the controller 140 may receive from the touch device 200 information of input attribute on a user interface window for a touch device. Specifically, on a screen of the touch device 200, a user interface window to receive an input attribute on a touch may be displayed. Accordingly, when a user interface window for a mobile device which is displayed in the interface 120 is to be configured as the same as a user interface window for a touch device, information on the configurations of an input attribute may be transmitted to the mobile apparatus 100 according to a user selection at the touch device 200. In other words, a user may set a user interface window using the touch device 200 initially which can then be transmitted to the mobile apparatus 100 such that when a user later uses the mobile apparatus 100 to select an attribute, the interface window that will be shown is that which the user selected initially at the touch device 200.

Herein, the information on the configurations of an input attribute may be information on at least one input attribute included in a user interface window for a touch device.

Therefore, the controller 140, by using information on the configurations of an input attribute, may configure a user interface window for a mobile apparatus to be the same as a user interface window for a touch device. In addition, the controller 140, by storing the configured user interface window in the storage 130, may update the configurations of a user interface window.

According to another exemplary embodiment, a configuration change item to change the configuration of at least one input attribute may be included in the user interface window. Therefore, when a user selects this configuration change item, the interface 120 receives a user command to change the configuration of at least one input attribute included in the user interface window.

The controller 140, according to the user command, may control the interface 120 to display an input attribute selection window to select an input attribute. Herein, the input attribute may include all the input attributes usable for writing and drawing operations.

Also, the controller 140, by using the input attribute selected by a user at the input attribute selection window, may configure the user interface window. The controller 140, by storing the user interface window in the storage 130, may update the configurations of the user interface window.

As described above, by configuring the user interface window, an input attribute may be selected in accordance with user's convenience and favor.

Figure 3:
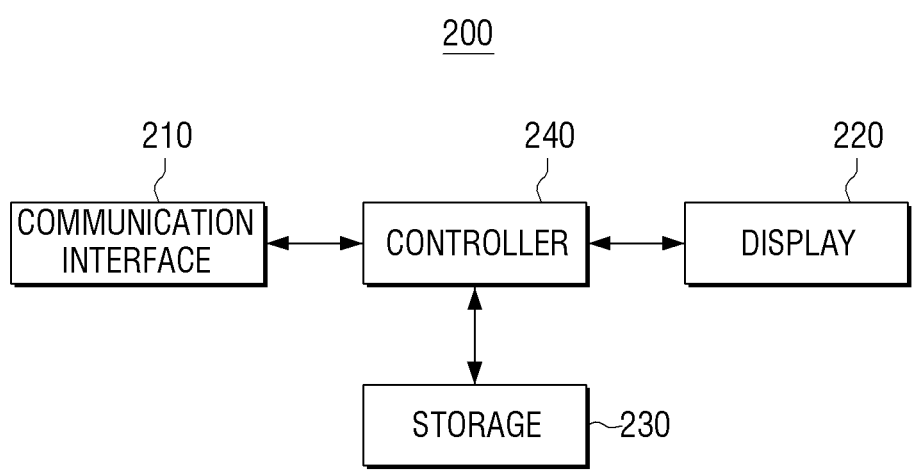
FIG. 3 is a block diagram illustrating the configuration of a touch device according to an exemplary embodiment.

FIG. 3 is a block diagram illustrating the configuration of a touch device according to an exemplary embodiment. The touch device 200 illustrated in FIG. 3 includes a communication interface 210, a display 220, a storage 230, and a controller 240.

The touch device 200 is a display apparatus which senses a touch, and may be a touch TV or an electronic board. The touch device 200 may communicate with the mobile apparatus 100, and receive from the mobile apparatus 100 information on the input attribute which is to be used for writing and drawing operations.

First of all, the communication interface 210 communicates with the mobile apparatus 100. Specifically, the communication interface 210 may transmit to the mobile apparatus 100 a specific command or signal, and receive from the mobile apparatus 100 specific information.

The display 220 may display an image played in the touch device 200, and display a user interface window to select the input attribute according to a touch. Further, the display 220, by a touch screen, may receive a signal in accordance with a touch along with displaying of an image.

The storage 230 stores information on the various programs and a device related to the operations of the touch device 200. Further, authentication information on the mobile apparatus 100 and the configuration on display of the user interface window may be stored.

The controller 240 controls overall operations of the touch device 200.

The controller 240 may control the communication interface 210 to transmit a user authentication command related to selection of an input attribute in accordance with a touch to the mobile apparatus 100. In this case, the user authentication command, when the mobile apparatus 100 is detected by the touch device 200 by wireless communication with the mobile apparatus 100, or by the use of a button or an item related to user authentication being touched, may be transmitted to the mobile apparatus 100.

The controller 240, when authentication information is received from the mobile apparatus 100 as a reply to a user authentication command, may compare with authentication information stored in the storage 230, and approve authentication when the information is correct.

The controller 240 may control the communication interface 210 to transmit a display command for the user interface window of the mobile apparatus 100. Herein, the display command for the user interface window may be transmitted when a user event to control the input attribute of the touch device 200 occurs by using the mobile apparatus 100, or may be transmitted when user authentication of the mobile apparatus 100 is approved.

The controller 240, when information on the input attribute is received from the mobile apparatus 100, may set the input attribute according to a touch by using information on the input attribute. Herein, information on the input attribute may include at least one of type of the selected input attribute or an attribute value of the input attribute, which are selected by a user.

For example, when information on the input attribute includes "an eraser" which is type of the input attribute, the controller 240 may set the input attribute of the touch which is input after receiving information of the input attribute as "an eraser." Therefore, when a touch is input to the display 220, the controller 240 may control the display 220 so that letters or drawings in the area where a touch is input may be erased.

As another example, when information on the input attribute includes "font of letters" which is type of the input attribute and "Batang font" which is an attribute value of the input attribute, the controller 240 may set the input attribute of a touch which is input after receiving information on the input attribute as "font of letters—Batang font." Accordingly, when a touch is input to the display 220, the controller 240 may control the display 220 to display letters written in an area where a touch is input as Batang font.

According to the touch device 200 illustrated in FIG. 3, the mobile apparatus 100, by using information on the received input attribute, may rapidly set an input attribute of a touch which is input to the display 220.

Figure 4:
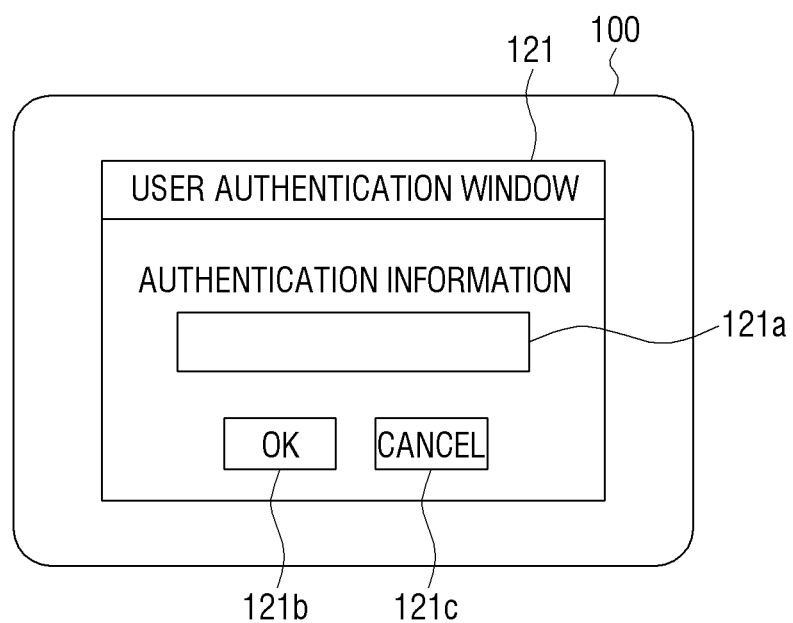
FIG. 4 is a view illustrating a user authentication window according to an exemplary embodiment.

FIG. 4 is a view illustrating a user authentication window according to an exemplary embodiment. The user authentication window 121 as illustrated in FIG. 4 is for user authentication related to selection of an input attribute in accordance with a touch.

According to the exemplary embodiments, the mobile apparatus 100 may select the input attribute on a touch which is input to the touch device 200. In this case, when another mobile apparatus which is not authenticated by the touch device 200 communicates with the touch device 200, another input attribute which is different from the intention of a user who uses the mobile apparatus 100 and the touch device 200 may be received but not implemented because the other mobile apparatus is not authenticated.

For example, when performing teaching by using the touch device 200, a teacher may select an input attribute on a touch which is input to the touch device 200 by using the mobile apparatus 100.

However, if it is available to select an input attribute by using another mobile apparatus which a user owns, an input attribute may be selected by the student regardless of intention of the teacher who is leading the lesson. If, several students select the input attribute at the same time by using their mobile apparatuses, it may hinder teaching, and the touch device 200 may have an error in operation. Therefore, so that only the input attribute may be selected by the mobile apparatus 100 which is authenticated by the touch device 200, the mobile apparatus 100 may have authentication process.

When the user authentication command is received from the touch device 200, the mobile apparatus 100 may display a user authentication window 121 in accordance with the user authentication command. The user authentication window 121 may include the input section 121a to input authentication information, OK button 121b, and cancel button 121c.

A user may input authentication information in the input section 121a. In this case, when a user touches the input section 121a, a keypad to input authentication information may be displayed.

In addition, while authentication information is input in the input section 121a, when a user presses the OK button 121b, the mobile apparatus 100 may transmit to the touch device 200 authentication information.

On the other hand, if cancel button 121c is pressed, the mobile apparatus 100 may terminate an authentication process. When the authentication process is terminated, the mobile apparatus 100 may not perform the operations to select the input attribute.

The touch device 200 may approve authentication on the mobile apparatus 100 according to authentication information. For example, when the authentication information received from the mobile apparatus 100 is the same as authentication information prestored in the touch device 200, the touch device 200 approves authentication on the mobile apparatus 100. On the other hand, if the authentication information is not the same, the touch device 200 may reject authentication on the mobile apparatus 100. When authentication is rejected, the mobile apparatus 100 may not perform the operations to select an input attribute.

Through the aforementioned authentication process, the touch device 200 may select an input attribute from the mobile apparatus 100 with approved authentication. Accordingly, selection of an input attribute of a touch device 200 by another mobile apparatus which fails to receive authentication may be prevented.

Figure 5:
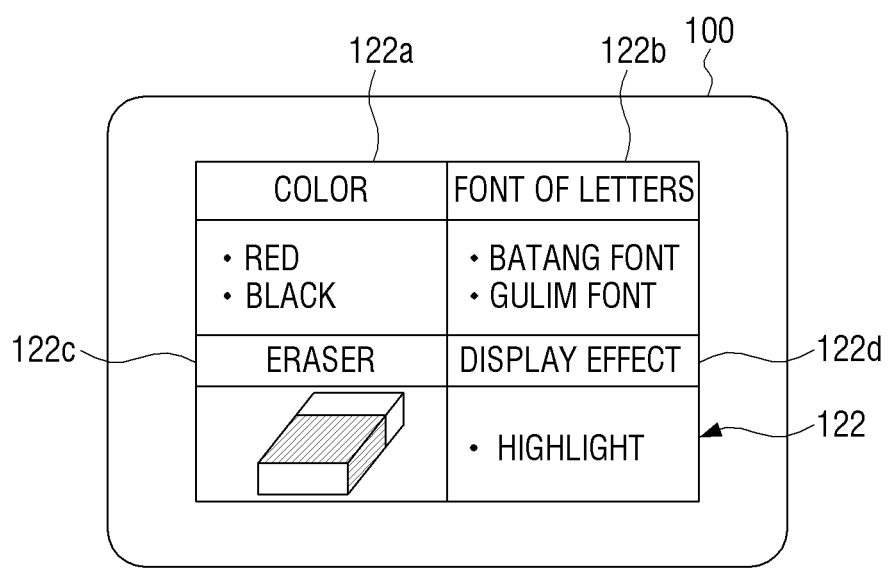
FIG. 5 is a view illustrating a user interface window according to an exemplary embodiment.

FIG. 5 is a view illustrating a user interface window according to an exemplary embodiment. The user interface window 122 as illustrated in FIG. 5, which is displayed in the mobile apparatus 100, is configured to allow a selection of an input attribute for a touch which is input to the touch device 200.

The user interface window 122 may include a color item 122a, an item of a font of letters 122b, an eraser item 122c, and a display effect item 122d.

When a user writes letters or draws a picture by touching a screen of the touch device 200, and intends to change color of letters or drawings, color 122a may be selected from the user interface window 122. Herein, the color 122a may include at least one color which may be changed. Therefore, a user may select color which the user wants from the color 122a.

When a user touches a screen of the touch device 200 and writes letters, and then intends to change a font of letters, the user may select font of letters 122b from the user interface window 122. Herein, the font of letters 122b may include at least one font of letters which is changeable. Therefore, a user may select font of letters from font of letters 122b when the user wants.

When a user wishes to delete letters or drawings by touching a screen of the touch device 200, the user may select an eraser 122c from the user interface window 122.

When a user wishes to apply a display effect such as highlight on letters or drawings by touching a screen of the touch device 200, the user may select a display effect 122d from the user interface window 122. The display effect may further include underline, enlargement aside from highlight.

The mobile apparatus 100, by transmitting information on the input attribute selected by a user to the touch device 200, from among color 122a, font of letters 122b, eraser 122c, and display effect 122d, may set an input attribute for a touch on the touch device 200.

The mobile apparatus 100 according to an exemplary embodiment may configure the user interface window in various ways in accordance with convenience and favor of a user. It will be further detailed with reference to FIGS. 6-8.

Figure 6B:
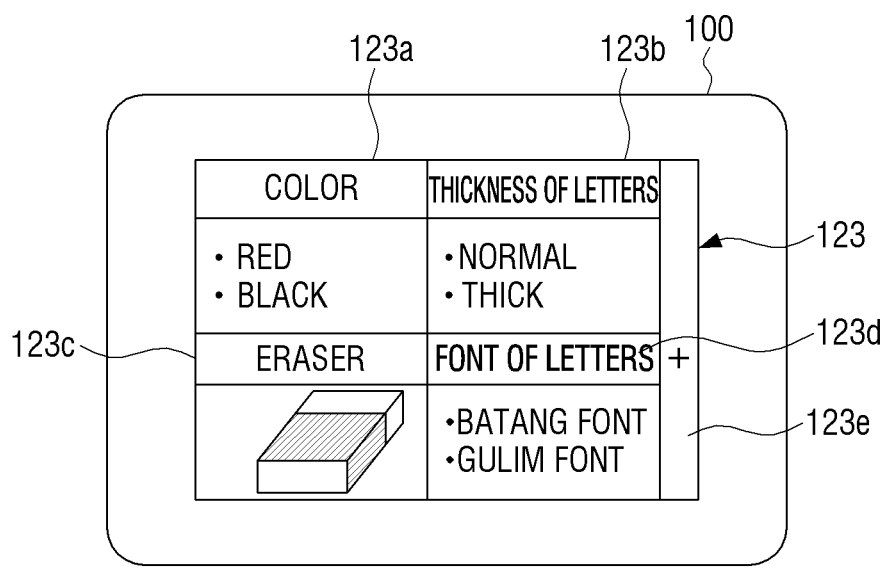

FIGS. 6A and 6B are views provided to explain a method for configuring a user interface window according to an exemplary embodiment.

In the user interface window displayed in the mobile apparatus 100, when a specific input attribute on a touch which is input to the touch device 200 is selected, the mobile apparatus 100 accumulates a selection frequency on the selected input attribute. Therefore, the mobile apparatus 100, as illustrated in FIG. 6B, may generate and store information on selection frequency 600 on the input attribute.

The selection frequency information 600 may include an input attribute priority 610 and a frequency 620. In the input attribute priority 610, a plurality of input attributes are listed in an order of higher accumulated frequency, and in the frequency 620, accumulated frequency on each input attribute is recited.

The mobile apparatus 100, by using the selection frequency information 600, may configure the user interface window 123 as illustrated in FIG. 6B. To be specific, the mobile apparatus 100, by selecting four input attributes having higher accumulated selection frequency from the selection frequency information 600, may configure the user interface window 123. Herein, the number of input attributes may be four, but it is not limited thereto, and the number may be different by user setting.

Further, according to another exemplary embodiment, each input attribute may include at least one attribute value. For example, as to font of letters, an attribute value such as Batang font and Gulim font may be included. The mobile apparatus 100 may accumulate selection frequency on the attribute value.

Referring to FIG. 6B, the user interface window 123 may include the first priority to the fourth priority of the input attribute such as color 123a, thickness of letters 123b, eraser 123c, and font of letters 123d. In addition, input attribute items 123a, 123b, 123c, and 123d may include an attribute value of each input attribute. In this case, input attributes 123a, 123b, 123c, and 123d may include 1-2 attribute values having higher accumulated selection frequency. However, the number of an attribute value is not limited thereto.

When checking other input attributes, when "+" (123e) on the right side of the user interface window (123) is selected, the fifth to the seventh input attributes may be displayed.

When the mobile apparatus 100 configures the user interface window 123 as the method illustrated in FIGS. 6A and 6B, the input attributes which a user frequently uses are displayed, and thus, user convenience in accordance with selection of the input attribute may be improved.

Figure 7A:
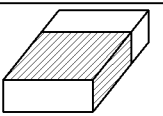
FIGS. 7A and 7B are views provided to explain a method for configuring a user interface window according to another exemplary embodiment.
Figure 7B:
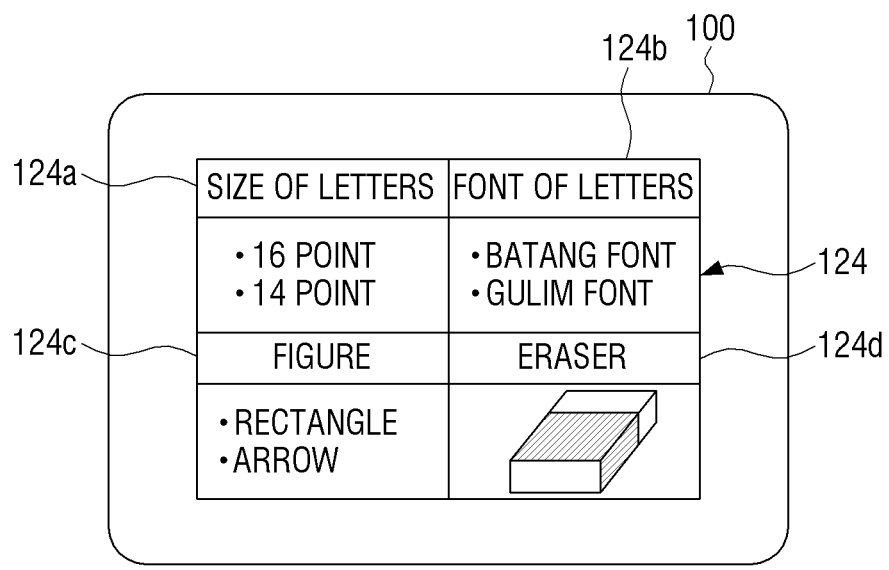

FIGS. 7A and 7B are views provided to explain a method for configuring a user interface window for a mobile apparatus using information on the configurations of input attribute on a user interface window for a touch device.

In a screen of the touch device 200, the user interface window to select an input attribute on a touch may be displayed. The user interface window may be a user interface window for a touch device, and is named as the first user interface window for convenience.

Further, a user interface window which is displayed on a screen of the mobile apparatus 100 is a user interface window for a mobile apparatus, and is named as the second user interface window.

As illustrated in FIG. 7A, the touch device 200 may generate and store input attribute configuration information 700 indicating that the first user interface window is configured with which input attributes.

The input attribute configuration information 700 may include size of letters 710, font of letters 720, FIG. 730, and eraser 740. In addition, each input attribute may include various attribute values.

The first user interface window may include the first setting item which may change the configuration of the first user interface window, and further, may include the second setting item which may change the configuration of the second user interface window displayed in the mobile apparatus 100. Therefore, when the second user interface window is configured to be the same as the first user interface window, a user may select or touch the second setting item included in the first user interface window. Accordingly, the touch device 200 may transmit the input attribute configuration information 700 on the first user interface window to the mobile apparatus 100.

The mobile apparatus 100 may configure the second user interface window to be the same as the first user interface window by using the input attribute configuration information 700. That is, as illustrated in FIG. 7B, the second user interface window 124 includes size of letters 124a, font of letters 124b, FIG. 124c, and eraser 124d, and may have the same input attribute configuration as the input attribute configuration information 700.

When the mobile apparatus 100 configures the second user interface window 124 as the method illustrated in FIGS. 7A and 7B, the second user interface window 124 is the same as the first user which is displayed on the screen of the touch device 200, and thus a user may use the second user interface window 124 in a familiar manner.

Figure 8A:
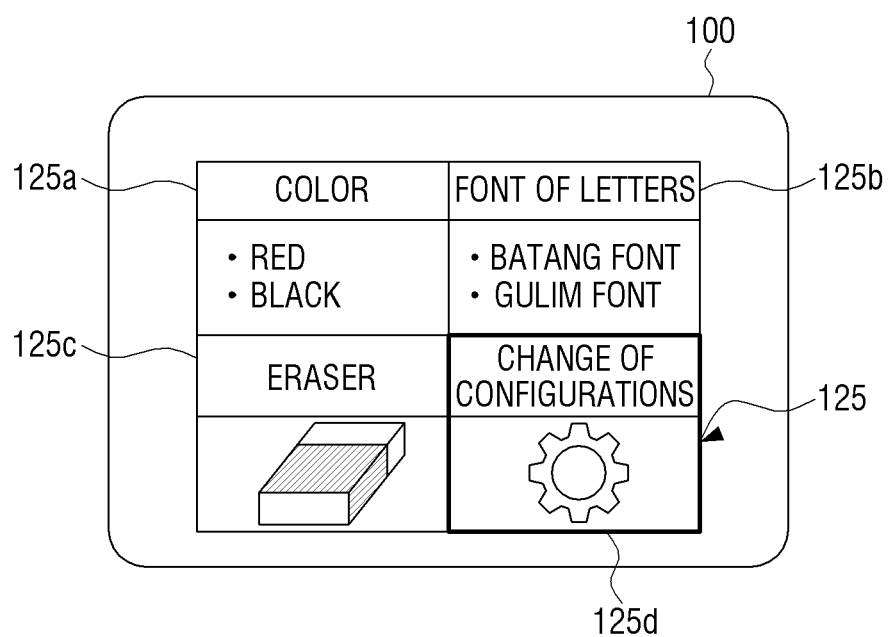
FIGS. 8A, 8B, and 8C are views provided to explain a method for configuring a user interface window according to still another exemplary embodiment.
Figure 8B:
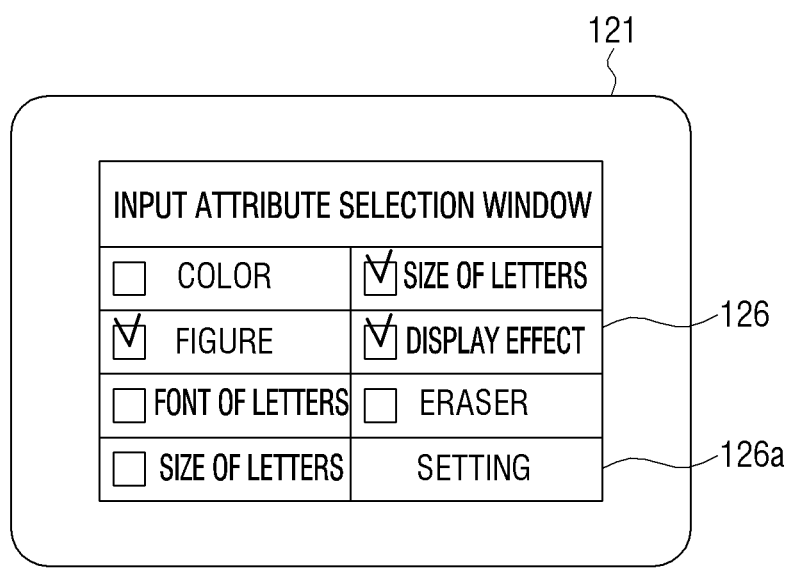
Figure 8C:
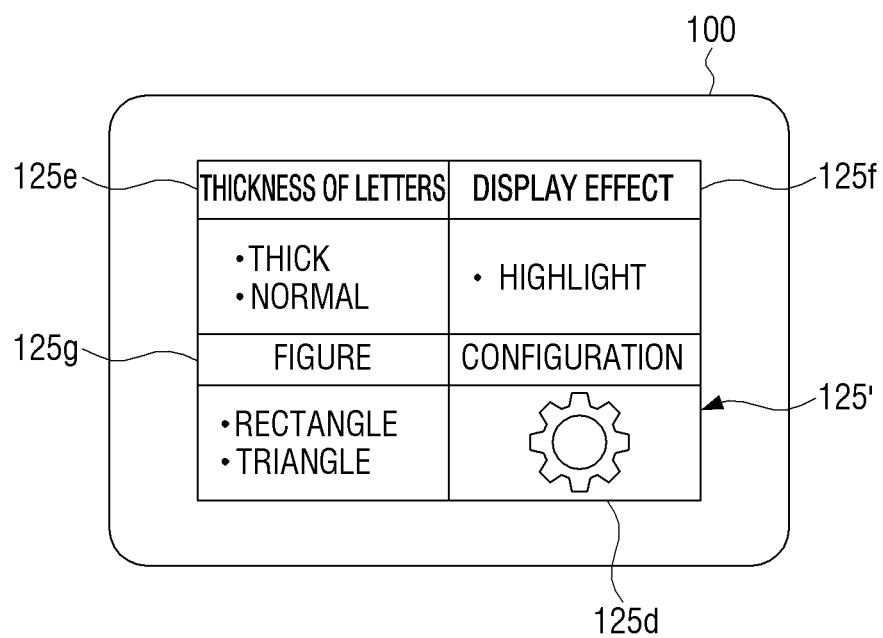

FIGS. 8A-8C are views provided to explain a method for configuring a user interface window according to still another exemplary embodiment.

As illustrated in FIG. 8A, the user interface window 125 may include color 125a, font of letters 125b, eraser 125c, and configuration change 125d. Herein, the configuration change 125d is to change the configuration on the input attribute included in the user interface window 125.

In the user interface window 125 displayed in the mobile apparatus 100, when the configuration change 125d is selected, the mobile apparatus 100 may display the input attribute selection window 126 as illustrated in FIG. 8B. Herein, the input attribute selection window 126 may include all the available input attributes which may be used for writing and drawing in accordance with a touch. That is, the input attribute selection window 126 may include input attributes such as color, figure, font of letters, size of letters, thickness of letters, display effect, and an eraser.

When a user selects the thickness of letters, display effect, and the eraser in the input attribute selection window 126, and press setting 126a included in the input attribute selection window 126, the mobile apparatus 100 as illustrated in FIG. 8C, may configure the user interface window 125' including the thickness of letters 125e, the display effect 125f, and the eraser 125g.

When the mobile apparatus 100 configures the user interface window 126 in a method illustrated in FIGS. 8A-8C, a user may configure the user interface window 126 with only the input attributes which a use requires, and thus, user convenience may be improved in accordance with selection of an input attribute.

Figure 9:
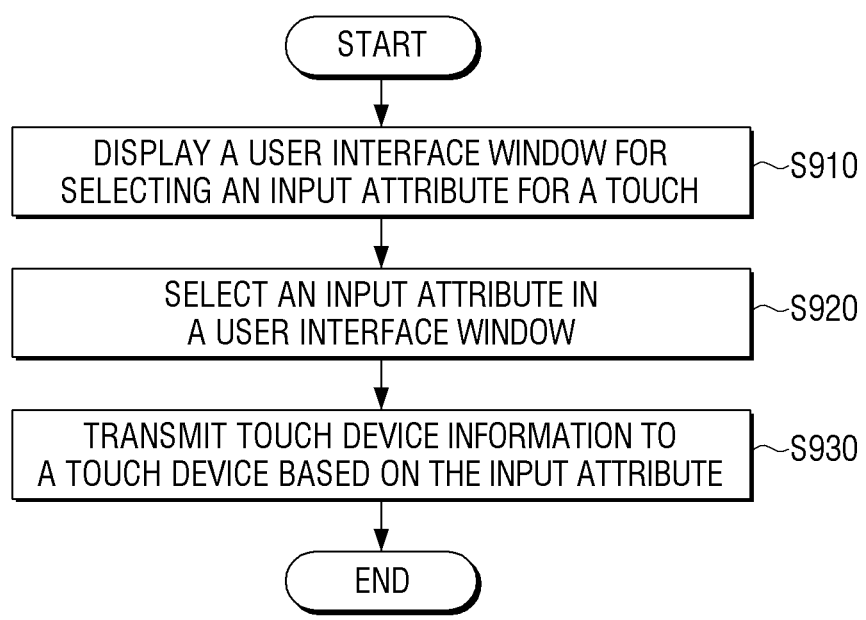
FIG. 9 is a flowchart of a method for controlling a mobile apparatus according to an exemplary embodiment.

FIG. 9 is a flowchart of a method for controlling a mobile apparatus according to an exemplary embodiment. Referring to FIG. 9, the mobile apparatus 100 displays the user interface window (S910) to select an input attribute for a touch which is input at the touch device 200. The touch device 200, by using a display apparatus which detects a touch, may be used to write letters or draw pictures. Accordingly, a user may select an input attribute which will be used for writing and drawing operations by a touch input at the mobile apparatus 100. Accordingly, the mobile apparatus 100 may display the user interface window for this.

The mobile apparatus 100, when an input attribute is selected from the user interface window (S920), transmits information on the selected input attribute to the touch device 200 (S930).

According to a controlling method of the mobile apparatus 100 as illustrated in FIG. 9, a user may select an input attribute by a touch while holding the mobile apparatus 100 with one hand, and be writing letters or drawing pictures by touching the touch device 200 with the other hand. Accordingly, while writing letters or drawing pictures, a user may immediately change an input attribute, and thus, it is not necessary that a user move or disengage from writing or drawings to change an input attribute.

FIG. 10 is a view provided to explain a method for controlling a mobile apparatus according to another exemplary embodiment.

Referring to FIG. 10, the touch device 200 transmits to the mobile apparatus 100 a user authentication command related to selection of an input attribute by a touch (S1000). According to an exemplary embodiment, during the authentication process, letters may be written or pictures maybe drawn by a touch input at the touch device 200. Once authentication is complete, an input attribute may be changed by the mobile apparatus 100.

The mobile apparatus 100 displays the user authentication window according to the user authentication command (S1100), and when the user authentication information is input to the user authentication window (S1200), and then the mobile apparatus 100 transmits the input authentication information to the touch device 200 (S1300).

The touch device 200 approves authentication by using authentication information received from the mobile apparatus 100 (S1400). Herein, the touch device 200, when the authentication information received from the mobile apparatus 100 corresponds to prestored authentication information, may approve authentication of the mobile apparatus 100.

When authentication on the mobile apparatus 100 is approved, the touch device 200 transmits a display command for the user interface window (S1500). Herein, the user interface window is to select an input attribute for a touch which is input to the touch device 200, which may include at least one input attribute which will be used for writing and drawing operations in accordance with a touch. The user interface window, as illustrated in FIGS. 6A-8C, may be configured in various ways according to favor and convenience of a user.

The mobile apparatus 100 displays the user interface window (S1600). In addition, the mobile apparatus 100, when an input attribute is selected from the user interface window (S1700), may transmit information on the selected input attribute to the touch device 200 (S1800).

The touch device 200 may set an input attribute according to a touch by using information on the input attribute (S1900). Accordingly, when a touch is input to the touch device 200, the touch device 200 may write letters or draw pictures according to a touch, by using the set input attribute.

A method for controlling a mobile apparatus according to an exemplary embodiment may be realized as a program including an algorithm executable in a computer, and the program may be stored in a non-transitory computer readable medium and provided.

The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as compact disc (CD), digital video disk (DVD), hard disk, Blu-ray disk, USB, memory card, and read-only memory (ROM) and provided therein.

The foregoing embodiments and advantages are merely exemplary and are not to be construed as limiting. The present teaching can be readily applied to other types of apparatuses. Also, the description of the exemplary embodiments is intended to be illustrative, and not to limit the range of the claims, and many alternatives, modifications, and variations will be apparent to those skilled in the art.

What is claimed is:

1. A mobile apparatus comprising:
    a communication interface configured to wirelessly communicate with an external touch device;
    a display; and
    a controller configured to:
        receive, from the external touch device through the communication interface, information of a plurality of attribute settings to be applied to a touch that is sensed on the external touch device,
        control the display to display a user interface window comprising the plurality of attribute settings based on the received information of the plurality of attribute settings, and
        in response to a user selecting one of the plurality of attribute settings displayed on the display of the mobile apparatus, transmit to the external touch device through the communication interface, a signal comprising a type of attribute and an attribute value corresponding to the selected attribute setting such that the external touch device processes a touch on the external touch device by applying the type of attribute and the attribute value,
    wherein the communication interface is further configured to receive from the external touch device a user authentication command related to selection of the attribute setting, and
    wherein the controller is further configured to control the display to display a user authentication window according to the user authentication command, and in response to authentication information being input in the user authentication window, control the communication interface to transmit the authentication information to the external touch device.

2. The mobile apparatus as claimed in claim 1, wherein the communication interface is further configured to receive from the external touch device a display command for the user interface window, and
    wherein the controller is further configured to control the display to display the user interface window according to the display command.

3. The mobile apparatus as claimed in claim 1, wherein the user interface window comprises at least one attribute setting which will be used for writing and drawing operations according to the touch on the external touch device.

4. The mobile apparatus as claimed in claim 3, wherein the controller is further configured to accumulate a selection frequency of the at least one attribute setting, and configure the user interface window to display the at least one attribute setting in an order of the selection frequency.

5. The mobile apparatus as claimed in claim 3, wherein the controller is further configured to arrange the user interface window to be the same as a user interface window of the external touch device based on the received information of the plurality of attribute settings.

6. The mobile apparatus as claimed in claim 3, wherein the controller is further configured to, in response to a user command being input from the mobile apparatus to change configuration of the at least one attribute setting included in the user interface window, control the display of the mobile apparatus to display a setting selection window and configure the user interface window based on selections made in the setting selection window.

7. The mobile apparatus as claimed in claim 3, wherein the at least one attribute setting is related to setting a color, a figure, a font of letters, a size of letters, a thickness of letters, a display effect, or an eraser which are used for the writing and drawing operations.

8. The mobile apparatus as claimed in claim 1, wherein the type of attribute is writing type, drawing type, or eraser type, and
the attribute value is a font size when the type of attribute is writing type.

9. The mobile apparatus as claimed in claim 1, wherein the external touch device is an electronic board.

10. A method for controlling a mobile apparatus, the method comprising:
receiving from the external touch device, information of a plurality of attribute settings to be applied to a touch that is sensed on the external touch device;
displaying a user interface window comprising the plurality of attribute settings, based on the received information of the plurality of attribute settings; and
transmitting, to the external touch device, in response to a user selecting one of the plurality of attribute settings displayed on the mobile apparatus, a signal comprising a type of attribute and an attribute value corresponding to the selected attribute setting such that the external touch device processes a touch on the external touch device by applying the type of attribute and the attribute value,
wherein the displaying the user interface window comprises:
receiving from the external touch device a user authentication command related to selection of the attribute setting;
displaying a user authentication window according to the user authentication command; and
transmitting, in response to authentication information being input in the user authentication window, the authentication information to the external touch device.

11. The method as claimed in claim 10, wherein the displaying the user interface window comprises:
receiving, from the external touch device, a display command for the user interface window; and
displaying the user interface window according to the display command.

12. The method as claimed in claim 10, wherein the user interface window comprises at least one attribute setting which will be used for writing and drawing operations according to the touch on the external touch device.

13. The method as claimed in claim 12, wherein the displaying the user interface window comprises:
accumulating a selection frequency of the at least one attribute setting and configuring the user interface window to display the at least one attribute setting in an order of the selection frequency.

14. The method as claimed in claim 12, wherein the configuring the user interface window comprises:
configuring, based on the received information of the plurality of attribute settings, the user interface window to be the same as the user interface window of the external touch device.

15. The method as claimed in claim 12, wherein the displaying the user interface window comprises:
displaying, in response to a user command being input, from the mobile apparatus, to change configuration of the at least one attribute setting included in the user interface window, a setting selection window; and
configuring the user interface window based on setting selections in the setting selection window.

16. The method as claimed in claim 12, wherein the at least one attribute setting is related to setting a color, figure, a font of letters, a size of letters, a thickness of letters, a display effect, or an eraser which are used for the writing and drawing operations.

17. The method as claimed in claim 10, wherein the type of attribute is writing type, drawing type or eraser type, and
the attribute value is a font size when the type of attribute is writing type.

18. A touch device comprising:
a communication interface configured to wirelessly communicate with an external mobile apparatus;
a display configured to sense a touch; and
a controller configured to:
control the communication interface to transmit, to the external mobile apparatus, a display command for displaying a user interface window such that the external mobile apparatus displays the user interface window, the user interface window comprising a plurality of attribute settings to be applied to a touch that is sensed on the touch device, and
in response to a user selecting one of the plurality of attribute settings displayed on the external mobile apparatus, to receive, from the mobile apparatus, a signal comprising a type of attribute and an attribute value corresponding to the selected attribute setting such that the touch device processes a touch on the touch device by applying the type of attribute and the attribute value,
wherein the communication interface is further configured to receive from the external touch device a user authentication command related to selection of the attribute setting, and
wherein the controller is further configured to control the display to display a user authentication window according to the user authentication command, and in response to authentication information being input in the user authentication window, control the communication interface to transmit the authentication information to the external touch device.

* * * * *